United States Patent
Soma et al.

(10) Patent No.: US 10,929,652 B2
(45) Date of Patent: Feb. 23, 2021

(54) INFORMATION PROVIDING DEVICE AND INFORMATION PROVIDING METHOD

(71) Applicant: Honda Motor Co., Ltd., Tokyo (JP)

(72) Inventors: Eisuke Soma, Saitama (JP); Hiromitsu Yuhara, Tokyo (JP); Keiichi Takikawa, Tokyo (JP); Shinichiro Goto, Saitama (JP); Satoshi Imaizumi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 28 days.

(21) Appl. No.: 15/997,700

(22) Filed: Jun. 5, 2018

(65) Prior Publication Data

US 2018/0357473 A1 Dec. 13, 2018

(30) Foreign Application Priority Data

Jun. 7, 2017 (JP) .............................. JP2017-112831

(51) Int. Cl.
*G06K 9/00* (2006.01)
*G10L 15/22* (2006.01)
(Continued)

(52) U.S. Cl.
CPC ......... *G06K 9/00335* (2013.01); *B60W 40/00* (2013.01); *G07C 5/06* (2013.01);
(Continued)

(58) Field of Classification Search
CPC ............ G01C 21/3664; G01C 21/3602; G01C 21/3667; G01C 21/3605; G01C 21/00;
(Continued)

(56) References Cited

U.S. PATENT DOCUMENTS 8,009,869 B2 * 8/2011 Kumon ..................... B60R 1/00
382/104
8,331,621 B1 * 12/2012 Allen ...................... G08G 1/015
382/104
(Continued)

FOREIGN PATENT DOCUMENTS

CN 102142253 8/2011
JP H1165434 3/1999
(Continued)

OTHER PUBLICATIONS

"Office Action of Japan Counterpart Application," with machine English translation thereof, datedf Sep. 24, 2019, p. 1-p. 8.
(Continued)

*Primary Examiner* — Aklilu K Woldemariam
(74) *Attorney, Agent, or Firm* — JCIPRNET (57) ABSTRACT

An information providing device and an information providing method capable of providing information according to a driving load while alleviating or eliminating a sense of discomfort of a user of a vehicle is provided. An information providing device includes an emotion determination unit that determines virtual emotion of a vehicle, and an output control unit that determines one or both of content and an output mode of the information that the output unit is caused to output according to the virtual emotion of the vehicle. The emotion determination unit determines predetermined emotion to be the virtual emotion of the vehicle when a condition that a period in which the traveling state of the vehicle detected by the traveling state detection unit is a predetermined traveling state has continued for a predetermined period or longer is satisfied.

13 Claims, 6 Drawing Sheets

(51) Int. Cl.
*G10L 25/63* (2013.01)
*G07C 5/06* (2006.01)
*B60W 40/00* (2006.01)
*G10L 13/033* (2013.01)
*G10L 13/04* (2013.01)

(52) U.S. Cl.
CPC .............. *G10L 15/22* (2013.01); *G10L 25/63* (2013.01); *G06K 9/00302* (2013.01); *G10L 13/033* (2013.01); *G10L 13/043* (2013.01)

(58) Field of Classification Search
CPC . G06F 3/0482; G06F 16/5854; G11B 19/025; G11B 2220/2545; G11B 2220/2562; G11B 2220/90; G11B 27/002; G11B 27/34; G11B 33/10; B60W 2520/105; B60W 2520/125; B60W 40/00; B60W 40/09; B60W 2050/0095; B60W 40/08; B60W 50/10; B60W 50/14; B60W 30/00; B60W 2540/04; G06K 9/00302; G06K 9/00335; G06K 9/00798; G06K 9/00791; G06K 9/00805; G06K 9/00785; G06K 9/00825; G06K 2209/15; G06K 9/00; G06K 2207/1012; G06K 2209/21; G07C 5/06; G10L 13/033; G10L 13/043; G10L 15/22; G10L 25/63; A61B 5/18; A61B 5/6893; H04N 7/181; H04N 7/183; H04N 2101/00; G05D 2201/0213; G05D 1/0278; G08G 1/0175; G08G 1/143; G08G 1/017; G08G 1/133; G01S 19/42; G09G 2340/145
USPC .......... 382/104; 348/148, 149, 322; 345/810
See application file for complete search history.

(56) References Cited

U.S. PATENT DOCUMENTS

| | | | | |
|---|---|---|---|---|
| 2003/0048309 | A1* | 3/2003 | Tambata | G11B 19/025 715/810 |
| 2008/0105482 | A1 | 5/2008 | Yamaguchi et al. | |
| 2010/0329513 | A1* | 12/2010 | Klefenz | G06K 9/00805 382/104 |
| 2011/0043635 | A1* | 2/2011 | Fujita | B60W 40/09 348/149 |
| 2012/0098497 | A1* | 4/2012 | Ogane | B60W 20/13 320/134 |
| 2013/0145360 | A1* | 6/2013 | Ricci | B60W 50/08 717/174 |
| 2013/0152000 | A1 | 6/2013 | Liu et al. | |
| 2014/0309790 | A1* | 10/2014 | Ricci | H04L 63/0428 700/276 |
| 2015/0172582 | A1* | 6/2015 | Kiyohara | H04N 5/2171 348/322 |
| 2015/0332103 | A1* | 11/2015 | Yokota | G01C 21/3667 348/149 |
| 2015/0332104 | A1* | 11/2015 | Kapach | G06K 9/6202 382/104 |
| 2017/0060839 | A1 | 3/2017 | Kawamura | |
| 2017/0206694 | A1 | 7/2017 | Jiao et al. | |
| 2017/0303842 | A1* | 10/2017 | Yoshida | A61B 5/18 |
| 2019/0276037 | A1* | 9/2019 | Ito | A61B 5/18 |

FOREIGN PATENT DOCUMENTS

| | | |
|---|---|---|
| JP | H11272639 | 10/1999 |
| JP | 2003072488 | 3/2003 |
| JP | 2006350567 | 12/2006 |
| JP | 2008151678 | 7/2008 |
| JP | 2008-241309 | 10/2008 |
| JP | 2010224153 | 10/2010 |
| JP | 2011204226 | 10/2011 |
| JP | 2013078969 | 5/2013 |
| JP | 2015022124 | 2/2015 |
| JP | 2016062359 | 4/2016 |
| JP | 2017049427 | 3/2017 |
| JP | 2018530017 | 10/2018 |
| WO | 2014156055 | 10/2014 |
| WO | 2017015949 | 2/2017 |
| WO | 2017057170 | 4/2017 |

OTHER PUBLICATIONS

"Office Action of Japan Counterpart Application", dated Jan. 29, 2019, with English translation thereof, p. 1- p. 7.
"Office Action of Japan Counterpart Application", dated Sep. 29, 2020, with English translation thereof, pp-1-8.

* cited by examiner

INFORMATION PROVIDING DEVICE AND INFORMATION PROVIDING METHOD

CROSS-REFERENCE TO RELATED APPLICATION

This application claims the priority of Japan patent application serial no. 2017-112831, filed on Jun. 7, 2017. The entirety of the above-mentioned patent application is hereby incorporated by reference herein and made a part of this specification.

BACKGROUND

Technical Field

The present disclosure relates to an information providing device and an information providing method.

Description of Related Art

In the related art, a device that provides information to occupants of a vehicle is known.

For example, a technology of Patent Document 1 discloses a device capable of providing information without hindering attention of a driver by reserving information without presenting the information when a driving load is high and presenting the information when the driving load is low according to a driving load level of the driver.

[Patent Document] Japanese Laid-open No. 2008-241309

In the technology of Patent Document 1, a determination is made as to whether or not presentation of information is needed on the basis of a driving load level. Since a load situation of driving changes from moment to moment, there is a possibility of switching between output and non-output of information frequently occurring according to a change in driving load level, and there is concern that a user of the vehicle may feel discomfort.

SUMMARY

Therefore, the present disclosure provides an information providing device and an information providing method capable of providing information according to a driving load while alleviating or eliminating a sense of discomfort of a user of a vehicle.

An information providing device according to the present disclosure includes an output unit that outputs information; a traveling state detection unit that detects a traveling state of a vehicle; an emotion determination unit that determines a virtual emotion of the vehicle; and an output control unit that determines one or both of content and an output mode of the information that the output unit is caused to output according to the virtual emotion of the vehicle, wherein the emotion determination unit is configured to determine a predetermined emotion to be the virtual emotion of the vehicle when a condition that a period in which the traveling state of the vehicle detected by the traveling state detection unit is a predetermined traveling state has continued for a predetermined period or longer is satisfied.

An information providing method according to the present disclosure, which is a method that is executed by a computer including an output unit that outputs information and a traveling state detection unit that detects a traveling state of a vehicle, the method comprising: a first step of determining a virtual emotion of the vehicle; and a second step of determining one or both of content and an output mode of the information that the output unit is caused to output according to the virtual emotion of the vehicle, wherein the first step determines a predetermined emotion to be the virtual emotion of the vehicle when a condition that a period in which the detected traveling state of the vehicle is a predetermined traveling state has continued for a predetermined period or longer is satisfied.

DESCRIPTION OF THE EMBODIMENTS

Configuration of Basic System

Figure 1:
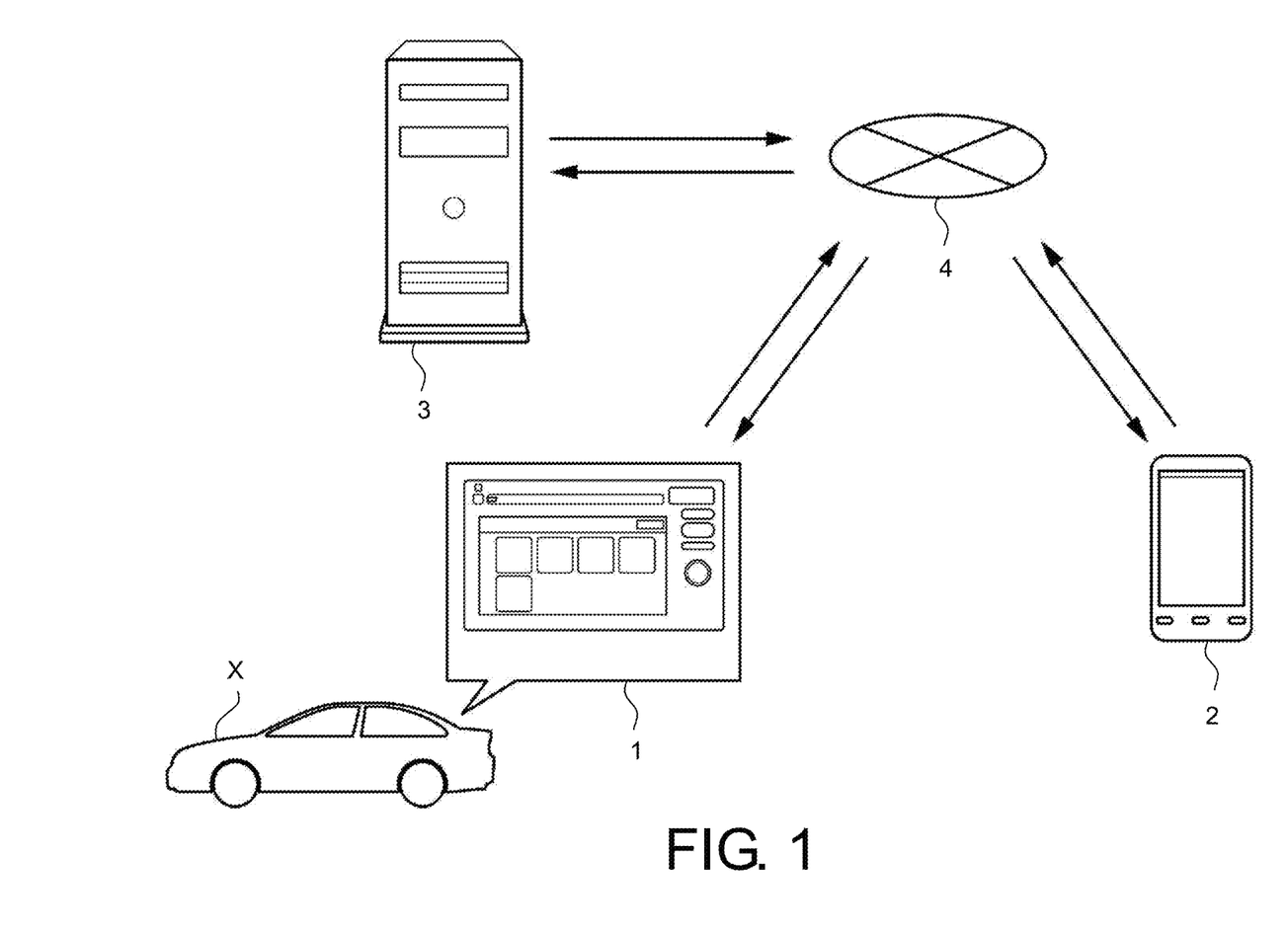
FIG. 1 is a diagram illustrating a configuration of a basic system.

A basic system illustrated in FIG. 1 includes an agent device 1 that is mounted on a target vehicle X (mobile body), a portable terminal device 2 (for example, a smart phone) which can be brought into the target vehicle X by an occupant, and a server 3. The agent device 1, the portable terminal device 2, and the server 3 have a function of wirelessly communicating with each other over a wireless communication network (for example, the Internet) 4. When the agent device 1 and the portable terminal device 2 are physically close to each other such as coexisting in a space of the same target vehicle X, the agent device 1 and the portable terminal device 2 wirelessly communicate with each other using a proximity wireless scheme (for example, Bluetooth (registered trademark)). The target vehicle X corresponds to a "vehicle" of the present disclosure.

Configuration of Agent Device

Figure 2:
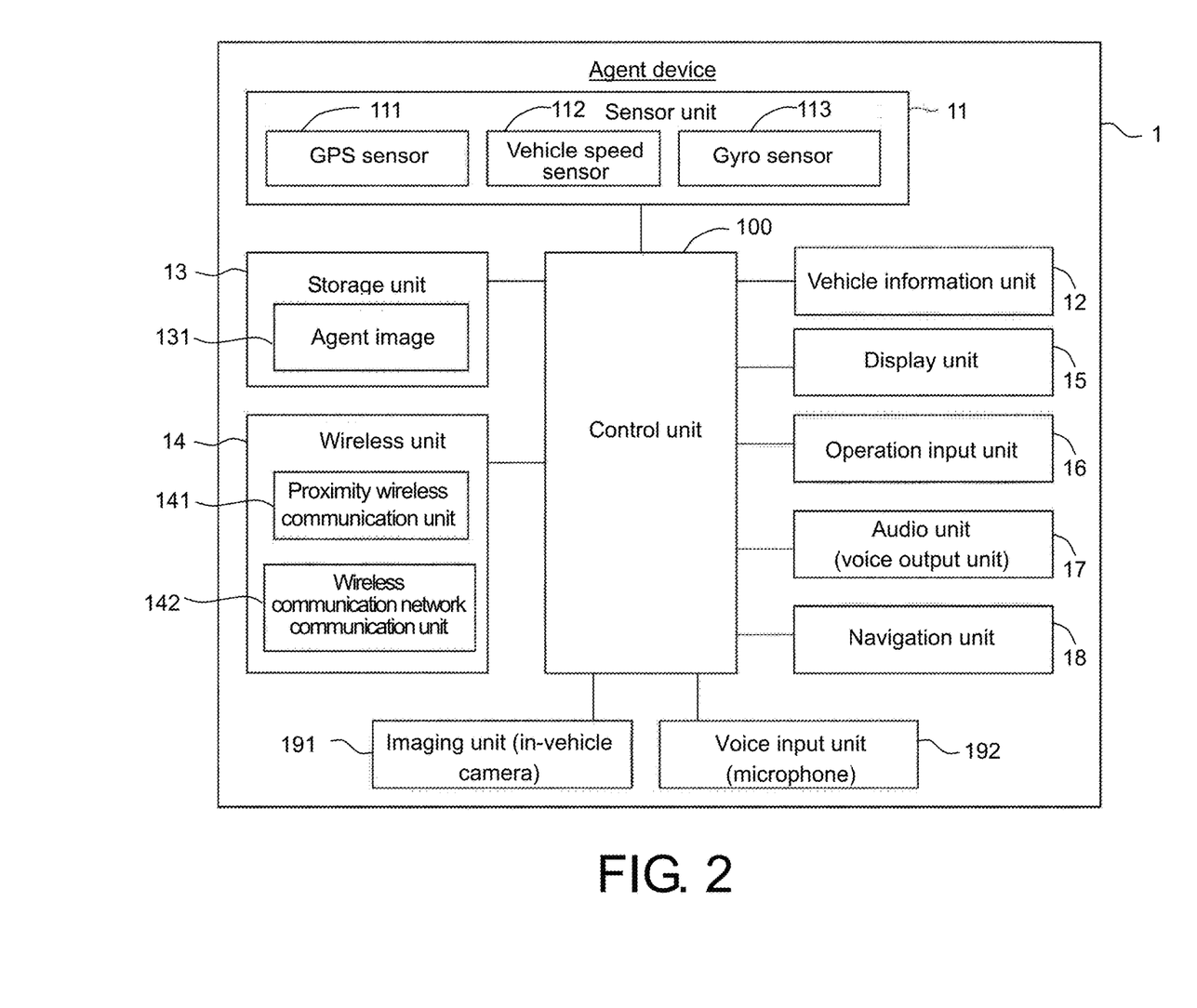
FIG. 2 is a diagram illustrating a configuration of an agent device.

The agent device 1 includes a control unit 100, a sensor unit 11 (including a GPS sensor 111, a vehicle speed sensor 112, and a gyro sensor 113), a vehicle information unit 12, a storage unit 13, a wireless unit 14 (including a proximity wireless communication unit 141 and a wireless communication network communication unit 142), a display unit 15, an operation input unit 16, an audio unit 17 (a voice output unit), a navigation unit 18, an imaging unit 191 (an in-vehicle camera), and a voice input unit 192 (a microphone), for example, as illustrated in FIG. 2. The agent device 1 corresponds to an example of an "information providing device" of the present disclosure. Each of the display unit 15 and the audio unit 17 corresponds to an example of an "output unit" of the present disclosure. Each of the operation input unit 16 and the voice input unit 192 corresponds to an example of an "input unit" of the present disclosure. The sensor unit 11 corresponds to a "traveling state detection unit" of the present disclosure. The control unit 100 functions as an "emotion determination unit", an "output control unit", a "preference estimation unit", and a "user emotion estimation unit" of the present disclosure by executing a calculation to be described below. Note that it is unnecessary for all the components of the information providing device to be included in the agent device 1, and the agent device 1 may cause an external server or the like to execute necessary functions through communication and thereby function as a component of the information providing device.

The GPS sensor 111 of the sensor unit 11 calculates a current position on the basis of a signal from a Global Positioning System (GPS) satellite. The vehicle speed sensor 112 calculates a speed of the target vehicle X on the basis of a pulse signal from a rotation shaft. The gyro sensor 113 detects an angular velocity. It is possible to accurately calculate the current position or direction of the target vehicle X using the GPS sensor 111, the vehicle speed sensor 112, and the gyro sensor 113. Further, the GPS sensor 111 may acquire information indicating a current date and time from the GPS satellite.

The vehicle information unit 12 acquires vehicle information over an in-vehicle network such as a CAN-BUS (controller area network-bus). The vehicle information includes, for example, information on ON/OFF of an ignition switch (SW), and an operation situation of a safety device system (ADAS (advanced driver assistance systems), ABS (anti-lock brake system), airbag, or the like). The operation input unit 16 detects an input of the amount of operation of a steering, an accelerator pedal, or a brake pedal, an operation of windows and an air conditioner (temperature setting, or the like), or the like, which can be used for estimation of an emotion of an occupant, in addition to an operation such as pressing a switch.

The storage unit 13 stores an agent image 131.

Figure 4:
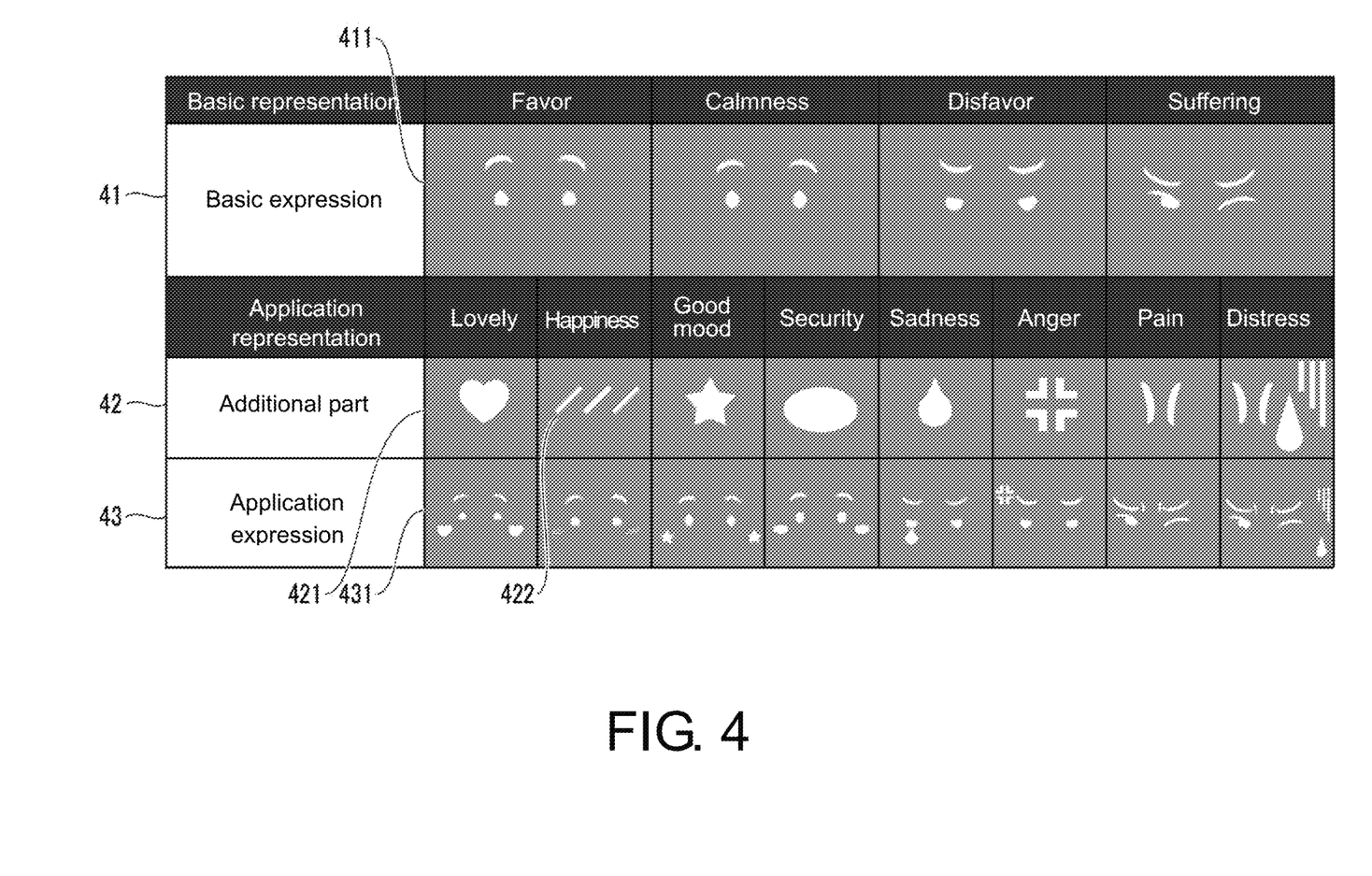
FIG. 4 is a diagram illustrating a configuration of an emotional representation of an agent.

The agent image 131 is an image imitating a face of a person as an image of a face of a virtual character of the vehicle X. As illustrated in FIG. 4, the agent image 131 includes a basic expression image 41 and an additional part 42. By combining the basic expression image 41 and the additional part 42, an application representation image 43 is formed. The agent image 131 is, for example, an image downloaded from the server 3.

For example, as illustrated in FIG. 4, the basic expression image 41 is each image corresponding to an emotion such as favor, calmness, disfavor, and suffering. The additional part 42 is a part regarding lovely, happiness, a good mood, security, sadness, anger, pain, and distress corresponding to the respective basic expression images 41.

For example, a basic expression image 411 of favor and an additional part 421 of lovely corresponding to favor are combined to form an application representation image 431 of lovely.

The proximity wireless communication unit 141 of the wireless unit 14 is, for example, a communication unit such as Wi-Fi (Wireless Fidelity (registered trademark)) or Bluetooth (registered trademark). The wireless communication network communication unit 142 is a communication unit that is connected to a wireless communication network represented by a so-called mobile phone network such as 3G, cellular, or LTE (long term evolution) communication.

Configuration of Portable Terminal Device

Figure 3:
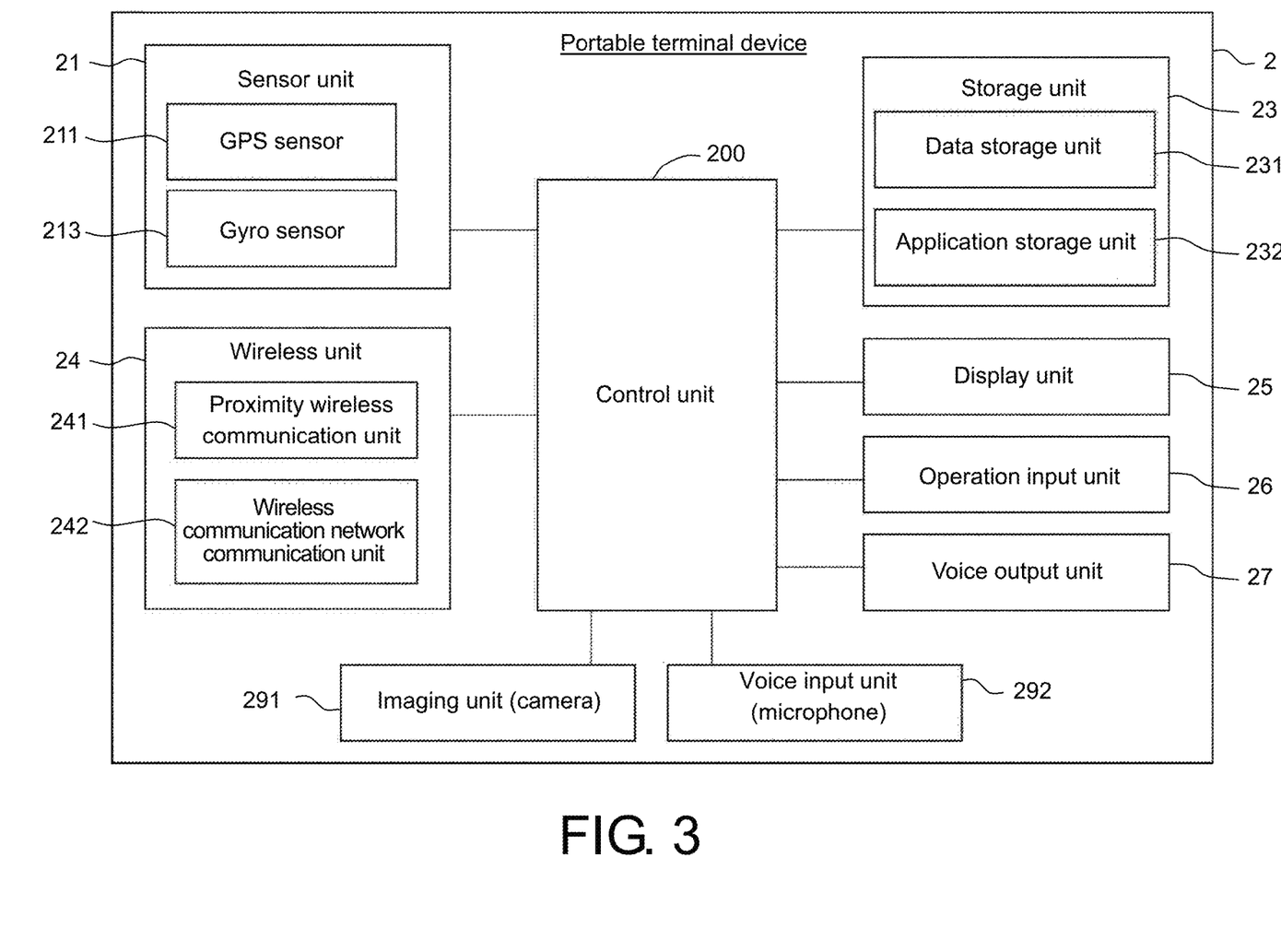
FIG. 3 is a diagram illustrating a configuration of a portable terminal device.

As illustrated in FIG. 3, the portable terminal device 2 includes a control unit 200, a sensor unit 21 (including a GPS sensor 211 and a gyro sensor 213), a storage unit 23 (including a data storage unit 231 and an application storage unit 232), a wireless unit 24 (including a proximity wireless communication unit 241 and a wireless communication network communication unit 242), a display unit 25, an operation input unit 26, a voice output unit 27, an imaging unit 291 (a camera), and a voice input unit 292 (a microphone). The portable terminal device 2 may function as the "information providing device" of the present disclosure. In this case, each of the display unit 25 and the voice output unit 27 corresponds to an example of an "output unit" of the present disclosure. Each of the operation input unit 26 and the voice input unit 292 corresponds to an example of the "input unit" of the present disclosure. The control unit 200 can function as an "emotion determination unit", an "output control unit", a "preference estimation unit", and a "user emotion estimation unit" of the present disclosure.

The portable terminal device 2 includes components common to the agent device 1. The portable terminal device 2 does not include a component that acquires vehicle information (see the vehicle information unit 12 in FIG. 2), but the portable terminal device 2 may acquire vehicle information from the "traveling state detection unit" included in in the agent device 1 or the target vehicle X through the proximity wireless communication unit 241, for example. Further, according to an application (software) stored in the application storage unit 232, the portable terminal device 2 may have the same functions as the audio unit 17 and the navigation unit 18 of the agent device 1.

Configuration of Server

The server 3 includes one or a plurality of computers. The server 3 receives data and a request from each of the agent device 1 or the portable terminal device 2, stores the data in a storage unit such as a database, executes a process according to the request, and transmits a processing result to the agent device 1 or the portable terminal device 2.

Some or all of the computers constituting the server 3 may be configured of components of a mobile station, such as one or a plurality of agent devices 1 or portable terminal devices 2.

A component of the present disclosure is "configured" to execute its arithmetic processing means that: an arithmetic processing unit such as a CPU (central processing unit) constituting the component is "programmed" or "designed" to read software in addition to necessary information from a memory such as a ROM (read only memory) or a RAM (random access memory) or a recording medium, and execute arithmetic processing for the information according to the software. Respective components may be configured of a common processor (arithmetic processing unit), and the respective components may be configured of a plurality of processors capable of communicating with each other.

Information Output Process

Next, an information output process will be described with reference to FIGS. 5 to 7.

Figure 5:
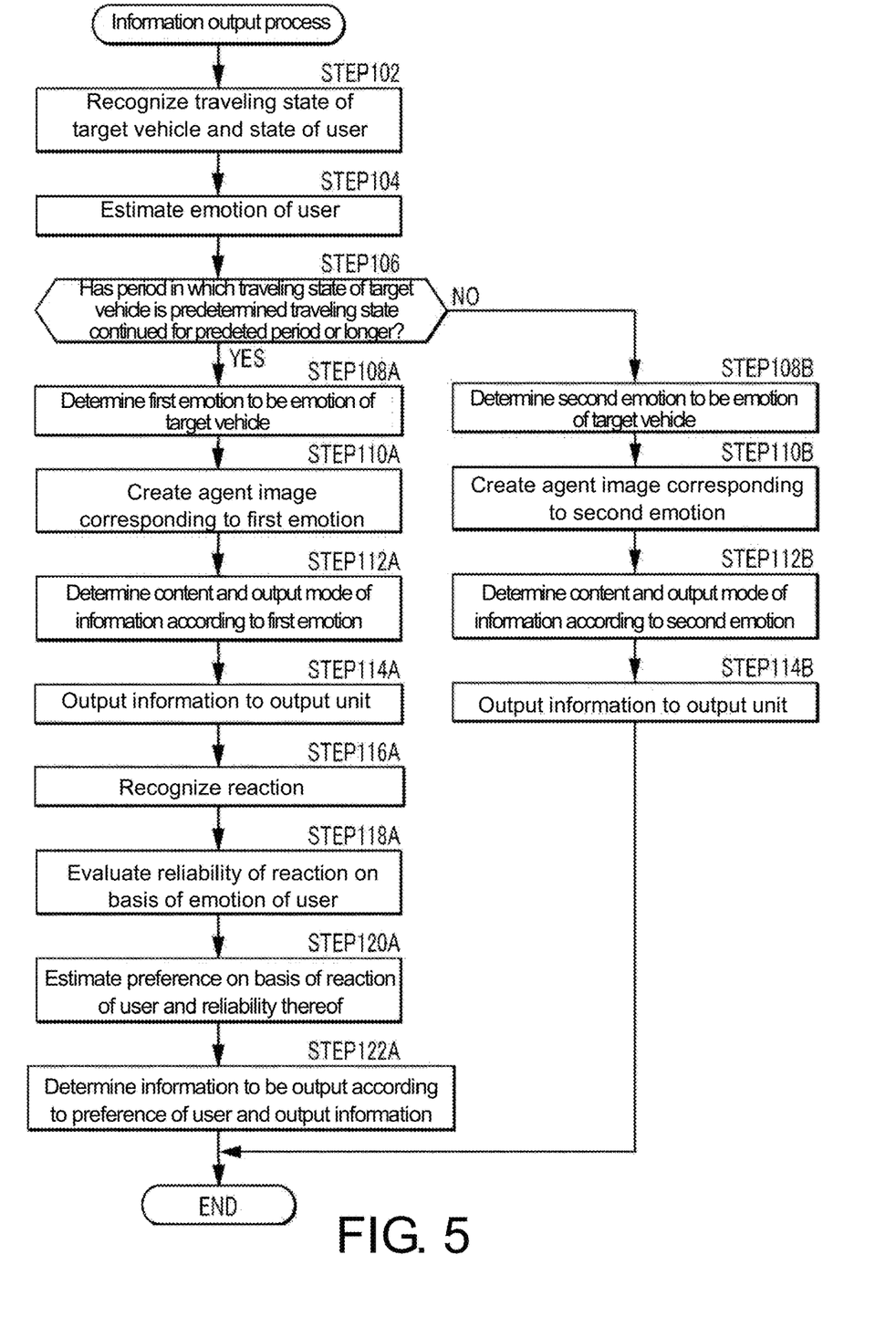
FIG. 5 is a flowchart of an information output process.

The control unit 100 of the agent device 1 acquires one or both of the traveling state of the target vehicle X and a state of a target user who is a user of the target vehicle X on the basis of at least one of information acquired by the sensor unit 11, an operation detected by the operation input unit 16, an image captured by the imaging unit 191, a sound detected by the voice input unit 192, and biological information of the target user acquired from a wearable sensor worn by the target user that is not illustrated (STEP 102 in FIG. 5). Further, the control unit 100 stores time-series data of one or both of the traveling state of the target vehicle X and the state of the target user that have been recognized in the storage unit 13.

For example, the control unit 100 recognizes a time-series position, a traveling speed of the target vehicle X, and a direction of the target vehicle X as the operation state of the target vehicle X on the basis of the information acquired by the sensor unit 11.

Further, for example, the control unit 100 recognizes an answer to a questionnaire such as "How are you feeling now?" as the state of the target user on the basis of the operation detected by the operation input unit 16.

Further, for example, the control unit 100 recognizes an expression and a behavior of the target user as the state of the target user on the basis of the image captured by the imaging unit 191.

Further, for example, the control unit 100 recognizes content of speech of the target user and a voice pitch at the time of speaking as the state of the target user on the basis of the voice detected by the voice input unit 192.

Further, for example, the control unit 100 recognizes biological information (myoelectricity, pulse, blood pressure, blood oxygen concentration, body temperature, or the like) received from the wearable device worn by the target user.

The control unit 100 estimates the emotion of the target user on the basis of one or both of the traveling state of the target vehicle X and the state of the target user (STEP 104 in FIG. 5).

For example, the control unit 100 may estimate the emotion of the target user on the basis of one or both of the traveling state of the target vehicle X and the state of the target user according to a predetermined rule.

Information indicating an emotion includes types of emotions such as favor, calmness, disfavor, and suffering, and an intensity represented by an integer and representing strength or weakness of the emotion. The type of emotion includes at least a positive emotion such as favor or calmness, and a negative emotion such as disfavor or suffering.

For example, when a state in which the speed of the target vehicle X is equal to or higher than a predetermined speed has continued for a predetermined time or longer, the control unit 100 may estimate a positive emotion, for example, favor, as a type of emotion of the target user. Further, when the state in which the speed of the target vehicle X is lower than the predetermined speed has continued for the predetermined time or longer or the speed of the target vehicle X frequently increases or decreases in a short period, the control unit 10 may estimate a negative emotion, for example, disfavor, as the type of emotion of the target user.

Further, the control unit 100 may estimate the higher value to be the strength of the emotion of the target user as such a state continues for a long time.

Further, the control unit 100 may estimate the emotion of the target user, for example, on the basis of the answer to the questionnaire. For example, when the answer to the questionnaire is "I am very calm", the control unit 100 may estimate the type of emotion of the target user to be the positive emotion "calmness", and the value of the strength of the emotion of the target user to be a large value (for example, 3). When the answer to the questionnaire is "I am slightly irritated", the control unit 100 may estimate the type of emotion of the target user to be the negative emotion "disfavor", and the value of the strength the emotion of the target user to be a small value (for example, 1).

Further, the control unit 100 may estimate the emotion of the target user on the basis of the expression of the target user. For example, when the control unit 100 performs an image analysis and determines that the target user smiles, the control unit 100 may estimate the type of emotion of the target user to be the positive emotion "favor", and the strength of the emotion of the target user to be a large value (for example, 5). Further, for example, when the control unit 100 performs the image analysis and determines that the target user is disgruntled, the control unit 100 may estimate the type of emotion of the target user to be the negative emotion "disfavor", and the strength of the emotion of the target user to be a small value (for example, 2). In addition to or instead of this, the control unit 100 may estimate the emotion of the target user by considering a line of sight or a direction of a face of the target user.

Further, the control unit 100 may estimate the emotion of the target user on the basis of the behavior of the target user. For example, when the control unit 100 performs the image analysis and determines that there is almost no motion of the target user, the control unit 100 may estimate the type of emotion of the target user to be the positive emotion "calmness", and the intensity of emotion to be a small value (for example, 2). Further, for example, when the control unit 100 performs the image analysis and determines the target user is moving restlessly, the control unit 100 may estimate the type of emotion of the target user to be the negative emotion "disfavor" and the strength of the motion to be a large value (for example, 4).

Further, the control unit 100 may estimate the emotion of the target user on the basis of the content of the speech of the target user. For example, when the control unit 100 performs a speech analysis and determines that the content of the speech of the target user is positive content such as praising or looking forward to something, the control unit 100 may estimate the emotion of the target user to be the positive emotion "favor" and the strength of the emotion of the target user to be a small value (for example, 1). For example, when the control unit 100 performs the speech analysis and determines that the content of the speech of the target user is negative content such as blaming something, the control unit 100 may estimate the emotion of the target user to be the negative emotion "disfavor" and the strength of the emotion of the target user to be a large value (for example, 5). Further, when a specific keyword ("good", "very good", or the like) is included in the speech content of the target user, the control unit 100 may estimate the type of emotion and the strength of the emotion associated with the keyword to be the emotion of the target user.

Further, the control unit 100 may estimate the emotion of the target user on the basis of a voice pitch when the target user speaks. For example, when the voice pitch of the target user speaking is equal to or higher than the predetermined pitch, the control unit 100 may estimate the emotion of the target user to be the positive emotion "favor" and the strength of the emotion of the target user to be a large value (for example, 5). When the voice pitch of the target user speaking is lower than the predetermined pitch, the control unit 100 may estimate the emotion of the target user to be the negative emotion "suffering", and the strength of the emotion of the target user to be an approximate medium value (for example, 3).

Further, the control unit 100 may estimate the emotion of the target user using the biological information (myoelectricity, pulse, blood pressure, blood oxygen concentration, body temperature, or the like) from the wearable device worn by the target user.

Further, for example, the control unit 100 may estimate the emotion of the target user on the basis of the traveling state of the target vehicle X and the state of the target user by using the emotion engine that outputs the emotion of the target user from the traveling state of the target vehicle X and the state of the target user generated by machine learning.

Further, for example, the control unit 100 may estimate the emotion of the target user on the basis of the traveling state of the target vehicle X and the state of the target user by referring to a predetermined table.

The control unit 100 may estimate the emotion of the target user by combining these.

The control unit 100 determines whether or not a condition that a period in which the traveling state of the target vehicle X is a predetermined traveling state has continued for a predetermined period or longer is satisfied (STEP 106 in FIG. 5).

The predetermined traveling state is preferably a state in which there is a possibility of traveling of the target vehicle X being stable, for example, like the target vehicle X traveling on an expressway. For example, the predetermined traveling state may be a state in which the traveling speed of the target vehicle X is included in a predetermined speed range (equal to or higher than a first speed higher than zero km/h and equal to or lower than a second speed equal to or higher than the first speed). Further, for example, the predetermined traveling state may be a state in which a longitudinal acceleration or a lateral acceleration of the target vehicle X is included in a predetermined acceleration range (equal to or higher than a first acceleration equal to or lower than zero km/h2 and equal to or lower than a second acceleration equal to or higher than zero km/h2) in which there is no sudden acceleration or sudden deceleration. Further, for example, the predetermined traveling state may be a state in which a direction of the target vehicle X is included within a predetermined angle range from a certain direction. The certain direction may be, for example, a traveling direction of the target vehicle X that is estimated from the time-series position of the target vehicle X.

The predetermined period is preferably a period (for example, 30 seconds, 1 minute, or 5 minutes) in which a probability of traveling of the target vehicle X being stable like the target vehicle X traveling on an expressway can be determined to be high.

When the determination result is positive (YES in STEP 106 in FIG. 5), the control unit 100 determines the first emotion to be a virtual emotion of the target vehicle X (STEP 108A in FIG. 5). The first emotion is, for example, a positive emotion such as favor, calmness, lovely, happiness, a good mood, and safety.

Further, the control unit 100 may determine the virtual emotion of the target vehicle X so that the virtual emotion is close to the emotion of the target user in consideration of the emotion of the target user. The control unit 100 may adjust an agent emotion index value to be the first emotion (for example, "happiness") and then determine the virtual emotion of the target vehicle X through the same process as that of STEP 108B in FIG. 5 to be described below.

The control unit 100 creates an agent image corresponding to the first emotion (STEP 110A in FIG. 5). For example, when the emotion is happiness, an application representation of happiness is created by combining a basic expression image of favor in the basic expression image 41 of FIG. 4 and an additional part of happiness in the additional part 42.

The control unit 100 selects the content and the output mode of the information to be output according to the first emotion (STEP 112A in FIG. 5). The content of the information to be output may be various pieces of content, such as a question about a preference of the user, other questions, news, bits of knowledge, introduction of a region in which the user is traveling, introduction of famous points, content such as music, and description thereof, but it is preferable for the question about the preference of the user to be included. Further, it is preferable for the amount of the information to be output to be abundant, and it is preferable for the amount of information to be equal to or greater than a predetermined threshold value. Further, it is preferable for an interval at which the information is output to be relatively short, and it is preferable for the information to be output at a predetermined interval or less. Further, it is preferable for the output mode of the information to be output reflecting the first emotion and, for example, it is preferable for a tone of the output voice to be high.

The control unit 100 outputs the information to one or both of the display unit 15 and the audio unit 17 according to the selected content and the selected output mode of the information to be output (STEP 114A in FIG. 5).

The control unit 100 recognizes at least one of the operation information, the expression of the target user, the behavior of the target user, the voice of the target user, and the biological information of the target user as the reaction of the target user through the operation input unit 16, the imaging unit 191, the voice input unit 192, and the wearable sensor (STEP 116A in FIG. 5).

The control unit 100 evaluates the reliability of the reaction of the user on the basis of the emotion of the target user (STEP 118A in FIG. 5). For example, when the emotion of the target user is a positive emotion, the control unit 100 evaluates the reliability of the reaction of the user to be higher as the strength of the emotion is higher. For example, the control unit 100 evaluates that the reliability of the reaction of the user is high in a case in which the emotion of the target user is the positive emotion as compared with a case in which the emotion of the target user is a negative emotion. For example, when the emotion of the target user is a negative emotion, the control unit 100 evaluates that the reliability of the reaction of the user is higher as the strength of the emotion of the target user is lower (the negative emotion is weaker).

The control unit 100 estimates the preference of the target user on the basis of the reaction of the target user and reliability thereof (STEP 120A in FIG. 5).

For example, when the question output in STEP 114A in FIG. 5 is "Do you like the sea?", a reaction of the user in STEP 116A in FIG. 5 has content such as an affirmative response to the question, and the reliability in STEP 118A in FIG. 5 is high, the control unit 100 determines that a likelihood of the user liking the sea is high. Further, for example, when the question output in STEP 114A in FIG. 5 is "Do you like the sea?", the reaction of the user in STEP 116A in FIG. 5 is the content of the affirmative response to the question, and the reliability in STEP 118A in FIG. 5 is low, the control unit 100 determines that the likelihood of the user liking the sea is low.

Further, for example, when the question output in STEP 114A in FIG. 5 is "Do you like the sea?", the reaction of the user in STEP 116A in FIG. 5 has content such as a negative response to the question, and the reliability in STEP 118A in FIG. 5 is high, the control unit 100 determines that a likelihood of the user disliking the sea is high. Further, for example, when the question output in STEP 114A in FIG. 5 is "Do you like the sea?", the reaction of the user in STEP 116A in FIG. 5 is the content of the negative response to the question, and the reliability in STEP 118A in FIG. 5 is low, the control unit 100 determines that the likelihood of the user disliking the sea is low.

The control unit 100 stores information indicating the estimated preference of the user in the storage unit 13 and transmits the information to the server 3. The server 3 stores the received information indicating the estimated preference of the user together with information for identifying the target user.

The control unit 100 determines information to be output on the basis of the estimated preference of the user, and outputs the information to one or both of the display unit 15 and the audio unit 17 (STEP 122A in FIG. 5).

For example, when the control unit 100 determines that a degree of likelihood of the user liking the sea is high, the control unit 100 may set an output frequency of information on the sea (news regarding the sea, topics regarding the sea, music regarding the sea, or introduction of the sea within a predetermined distance) to be higher than a predetermined reference, may set output content to be more detailed than a predetermined reference, may set an output time to be longer than a predetermined reference, or may be set, for example, an output sound volume to be higher than a predetermined reference.

Further, for example, when the control unit 100 determines that a degree of likelihood of the user disliking the sea is high, the control unit 100 may set the output frequency of information on the sea (news regarding the sea, topics regarding the sea, music regarding the sea, or introduction of the sea within a predetermined distance) to be lower than the predetermined reference, may set the output content to be briefer than the predetermined reference, may set the output time to be shorter than the predetermined reference, or may be set, for example, the output sound volume to be lower than the predetermined reference.

Further, when a likelihood of the preference of the user is low, the control unit 100 may output the same type of information in order to increase the likelihood of the preference of the user.

When the determination result in STEP 106 in FIG. 5 is negative (NO in STEP 106 in FIG. 5), the control unit 100 determines the second emotion as the virtual emotion of the target vehicle X, and determinates a representation according to the second emotion (STEP 108B in FIG. 5 and STEP 110B in FIG. 5). The control unit 100 determines the virtual emotion of the target vehicle X so that the virtual emotion becomes emotion similar to the emotion of the user. Further, the control unit 100 may determine the virtual emotion of the target vehicle X by considering the traveling state of the target vehicle X in addition to the emotion of the user such as being easy to be positive emotion at the time of stable traveling and to be negative emotion when there has been sudden braking or abrupt steering.

For example, the control unit 100 evaluates the emotion of the user with a first value of a steady state and a second value of stability, and evaluates the first value and the second value as an agent emotion index value.

Figure 6:
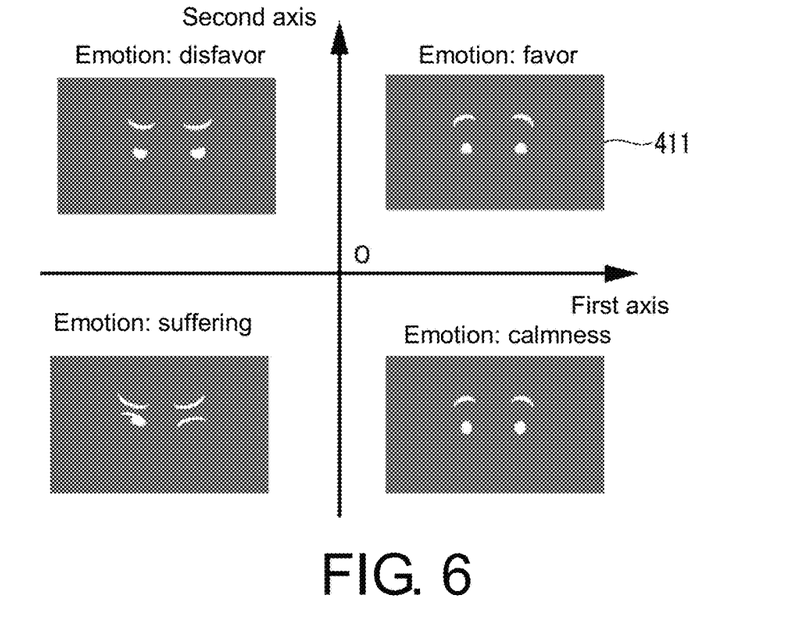
FIG. 6 is a diagram illustrating a map of basic emotional representation.
Figure 7:
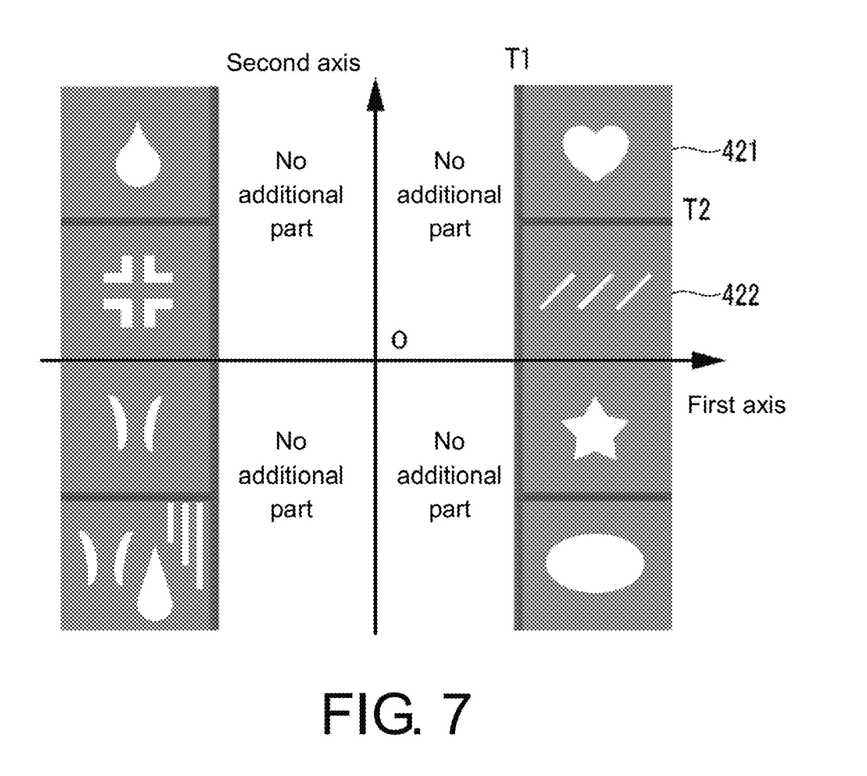
FIG. 7 is a diagram illustrating a map of additional parts.

The control unit 100 determines a virtual emotion of the target vehicle X on the basis of an emotion map illustrated in FIG. 6 or 7 on the basis of the agent emotion index value, and determines representation corresponding to the emotion. Note that the emotion maps in FIGS. 6 and 7 are represented by a first axis of steady state and a second axis of stability.

For example, when the agent emotion index value is included in a first quadrant of FIG. 6, the control unit 100 determines the virtual emotion of the target vehicle X to be "favor", and selects the basic expression image 411 of like as a basic representation of the emotional representation of the agent. Instead of or in addition to the image, the control unit 100 may select a voice message or music of which content or an utterance mode corresponds to the emotion of the agent, as a basic representation of the emotional representation of the agent.

Further, for example, when a value of the first axis of the agent emotion index value is equal to or greater than a first threshold value T1 and a value of the second axis thereof is equal to or greater than a second threshold value T2, the control unit 100 determines that the virtual emotion of the target vehicle X is "lovely" using a map as illustrated in FIG. 7 and selects the additional part 421 of "lovely" as an application representation of the emotional representation of the agent. Further, for example, when the value of the first axis of the agent emotion index value is equal to or greater than the first threshold value T1 and the value of the second axis thereof is equal to or greater than zero and smaller than the second threshold value T2, the control unit 100 determines that the virtual emotion of the target vehicle X is "happiness" and selects the additional part 422 of "happiness" as the application representation of the emotional representation of the agent. Further, for example, when the value of the first axis of the agent emotion index value is equal to or greater than zero and smaller than the first threshold value T1, the control unit 100 does not select the additional part as the application representation of the emotional representation of the agent. Further, the control unit 100 may select an additional part on the basis of an evaluation axis different from the first axis or the second axis.

Instead of or in addition to the image, the control unit 100 may select a voice message or music of which content or utterance mode corresponds to the emotion of the agent, as an additional part of the emotional representation of the agent.

The control unit 100 selects the content and the output mode of the information to be output, according to the second emotion (STEP 112B in FIG. 5). The content of the information to be output may be various pieces of content, such as news, bits of knowledge, introduction of a region at which the user is traveling, introduction of famous points, content such as music, and description thereof, but it is preferable for the question about the preference of the user not to be included. Further, it is preferable for the amount of the information to be output to be small, and it is preferable for the amount of information to be smaller than the predetermined threshold value. Further, it is preferable for an interval at which the information is output to be relatively long, and it is preferable for the information to be output at an interval equal to or longer than a predetermined interval. Further, it is preferable for the output mode of the information to be output to reflect the second emotion and, for example, it is preferable for a tone of the output voice to be low.

The control unit 100 outputs the information to one or both of the display unit 15 and the audio unit 17 according to the selected content and the selected output mode of the information to be output (STEP 114B in FIG. 5).

Advantageous Effects of Embodiment

According to the agent device 1 having this configuration, one or both of the content and the output mode of information to be output to one or both of the display unit 15 and the audio unit 17 are determined according to the virtual emotion of the target vehicle X (STEP 112A or STEP 112B in FIG. 5). A tendency according to the virtual emotion of the target vehicle X is reflected in the content or the output mode of the information to be output. An impression that the target vehicle X has emotion is given to a user who perceives the content or the output mode of information with various tendencies. Thus, even when one or both of the content and the output mode of the information are changed, it is possible for an impression that a change in the emotion of the target vehicle X is a cause to be given to the user, and to alleviate or eliminate a sense of discomfort to be given to the user.

Further, when a condition that the period in which the traveling state of the target vehicle X is the predetermined traveling state continues for a predetermined period or longer is satisfied (YES in STEP 106 in FIG. 5), the traveling of the target vehicle X is stable, and it is easy for a state in which a driving load is low to continue for a long time as compared with a case in which the condition is not satisfied. When the traveling of the target vehicle X is stable, the driving load of the user is inferred to be low. When the driving load is low, it is easy for the user to pay attention to the information to be output. Information is output with one or both of the content and the output mode of information on a tendency according to predetermined emotion in such a period in which it is easy for the user to pay attention to the information (STEP 114A in FIG. 5), thereby appropriately giving information while alleviating or eliminating a sense of discomfort to be given to the user as compared with a case in which one or both of the content and the output mode of information frequently change when the user pays attention to the information.

Accordingly, it is possible to appropriately give information to the user according to the driving load of the user while alleviating or eliminating a sense of discomfort to be given to the user.

According to the agent device 1 having such a configuration, the preference of the user is estimated on the basis of the reaction of the user to the information output to one or both of the display unit 15 and the audio unit 17 in the period when the condition is satisfied (STEP 120A in FIG. 5). As described above, the period in which the condition is satisfied is a period in which the driving load is estimated to be low, and it is inferred that it is easy for the user to pay attention to the provided information when the driving load is low. Therefore, since the reaction when the driving load is low is inferred to be a reaction after the user pays attention to the provided information, the preference of the user is highly likely to be indicated with high reliability.

Therefore, according to the agent device 1 having such a configuration, it is possible to accurately estimate preference of the user on the basis of a highly reliable reaction.

According to the agent device 1 having such a configuration, since the information to be output according to the predetermined emotion of the vehicle includes a question for estimating the preference of the user, it is possible to collect highly reliable information for estimating the preference of the user efficiently.

According to the agent device 1 having such a configuration, the agent device 1 is configured to determine the reliability with respect to the reaction of the user according to the emotion of the user estimated by the control unit 100 (STEP 118A in FIG. 5).

Here, the reliability of the reaction of the user is inferred to change according to the emotion of the user, for example, when mood of the user is bad, the user does not pay much attention to the provided information, and on the contrary, when the mood of the user is good, the user pays attention to the provided information and sincerely responds thereto.

Therefore, it is possible to appropriately evaluate the reliability of the information that is a basis of estimation of the preference of the user by adding the reliability to the reaction of the user according to the emotion of the user.

According to the agent device 1 having such a configuration, since the traveling speed of the target vehicle X is stable within a certain range in the period when the condition is satisfied, it is inferred that the driving load of the user is lowered, and it is easy for the user to pay attention to the information to be output from the output unit. In this period, one or both of the content and the output mode of the information to be output from the output unit are determined according to the predetermined emotion of the vehicle (STEP 112A in FIG. 5), thereby appropriately giving information to the user according to the driving load of the user while alleviating or eliminating a sense of discomfort to be given to the user.

According to the agent device 1 having such a configuration, since the acceleration of the target vehicle X is stable within a certain range in the period when the condition is satisfied, it is inferred that the driving load of the user is lowered, and it is easy for the user to pay attention to the information to be output from the output unit. In this period, one or both of the content and the output mode of the information to be output from the output unit are determined according to the predetermined emotion of the vehicle (STEP 112A in FIG. 5), thereby appropriately giving information to the user according to the driving load of the user while alleviating or eliminating a sense of discomfort to be given to the user.

According to the information providing device having such a configuration, one or both of the content and the output mode of information to be output to the output unit are determined according to the virtual emotion of the vehicle. A tendency corresponding to the virtual emotion of the vehicle is reflected in the content or the output mode of the information to be output. An impression as though the vehicle has emotions is given to a user who perceives the content or the output mode of information with various tendencies. Thus, even when one or both of the content and the output mode of the information are changed, it is possible for an impression that a change in the emotion of the vehicle is a cause to be given to the user, and to alleviate or eliminate a sense of discomfort given to the user.

Further, when a condition that the period in which the traveling state of the vehicle is a predetermined traveling state has continued for a predetermined period or longer is satisfied, the traveling of the vehicle is stable, and it is easy for a state in which a driving load is low to continue for a long time as compared with a case in which the condition is not satisfied. When the traveling of the vehicle is stable, the driving load of the user is inferred to be low. When the driving load is low, it is easy for the user to pay attention to the information to be output. Information is output with one or both of the content and the output mode of information on a tendency according to predetermined emotion in such a period in which it is easy for the user to pay attention to the information, thereby appropriately giving information while alleviating or eliminating a sense of discomfort to be given to the user as compared with a case in which one or both of the content and the output mode of information frequently change when the user pays attention to the information.

Accordingly, it is possible to appropriately give information to the user according to the driving load of the user while alleviating or eliminating a sense of discomfort given to the user.

It is preferable for the information providing device of the present disclosure to include an input unit that detects a reaction of a user of the vehicle to the information; and a preference estimation unit that estimates a preference of the user on the basis of a reaction of the user to the information detected by the input unit in a period in which the condition is satisfied.

In the present specification, the term "reaction" is used as a term including a response such as communication, action, or the like to a certain event, action, or the like, in addition to a motion that occurs on the basis of stimulation in a living body, such as an unconditioned reflex or a conditioned reflex.

According to the information providing device having such a configuration, the preference of the user is estimated on the basis of the reaction of the user to the information output to the output unit in a period in which the condition is satisfied. As described above, the period in which the condition is satisfied is a period in which the driving load is estimated to be low, and it is inferred that it is easy for the user to pay attention to the provided information when the driving load is low. Therefore, since the reaction when the driving load is low is inferred to be a reaction after the user pays attention to the provided information, the preference of the user is highly likely to be indicated with high reliability.

Therefore, according to the information providing device having such a configuration, it is possible to accurately estimate the preference of the user on the basis of a highly reliable reaction.

In the information providing device having such a configuration, it is preferable for information output according to the predetermined emotion to include a question for estimating the preference of the user.

According to the information providing device having such a configuration, since the information to be output according to the predetermined emotion of the vehicle includes the question for estimating the preference of the user, it is possible to collect highly reliable information for estimating the preference of the user efficiently.

It is preferable that these information providing devices include a user emotion estimation unit that estimates an emotion of the user of the vehicle, wherein the preference estimation unit is configured to determine reliability of a reaction of the user to the information detected by the input unit according to the emotion of the user estimated by the user emotion estimation unit.

According to the information providing device of the configuration, the reliability of a reaction of the user is determined according to the emotion of the user estimated by the user emotion estimation unit.

Here, it is inferred that the reliability of the reaction changes according to the emotion of the user, such as, when the mood of the user is bad, the user does not pay much attention to the provided information, and on the other hand, when the mood of the user is good, the user pays attention to the provided information and sincerely responds.

Therefore, it is possible to appropriately evaluate the reliability of the information that is a basis of estimation of the preference of the user by adding the reliability to the reaction of the user according to the emotion of the user.

In the information providing device of the present disclosure, it is preferable that the traveling state of the vehicle includes a traveling speed of the vehicle, and the condition is a condition that a period in which the traveling speed of the vehicle is included in a speed range that does not include zero has continued for a predetermined period or longer.

According to the information providing device having such a configuration, since the traveling speed of the vehicle is stable within a certain range in the period in which the condition is satisfied, it is inferred that the driving load of the user is lowered, and it is easy for the user to pay attention to the information to be output from the output unit. In this period, one or both of the content and the output mode of the information to be output from the output unit are determined according to the predetermined emotion of the vehicle, thereby appropriately giving information to the user according to the driving load of the user while alleviating or eliminating a sense of discomfort given to the user.

In the information providing device of the present disclosure, it is preferable that the driving state of the vehicle includes an acceleration of the vehicle, and the condition be a condition that a period in which the acceleration of the vehicle is included in an acceleration range including zero has continued for a predetermined period or longer.

According to the information providing device having such a configuration, since the acceleration of the vehicle is stable within a certain range in the period in which the condition is satisfied, it is inferred that the driving load of the user is lowered, and it is easy for the user to pay attention to the information to be output from the output unit. In this period, one or both of the content and the output mode of the information to be output from the output unit are determined according to the predetermined emotion of the vehicle, thereby appropriately giving information to the user according to the driving load of the user while alleviating or eliminating a sense of discomfort given to the user.

What is claimed is:

1. An information providing device comprising:
   an output device that outputs information;
   a sensor that detects a traveling state of a vehicle; and
   a controller that determines a virtual emotion of the vehicle; and determines one or both of content and an output mode of the information that the output device is caused to output according to the virtual emotion of the vehicle,
   wherein the controller is configured to
   determine whether the traveling state of the vehicle is a predetermined traveling state,
   select a type from a first emotion type and a second emotion type based on whether a period in which the traveling state of the vehicle detected by the sensor is the predetermined traveling state has continued for a predetermined period or longer,
   estimate an emotion of a user of the vehicle,
   select an emotion from the selected type as the virtual emotion of the vehicle based on the emotion of the user of the vehicle,
   wherein the second emotion type is selected when the period in which the traveling state of the vehicle detected by the sensor is the predetermined traveling state has not continued for a predetermined period or longer,
   wherein the traveling state of the vehicle includes an acceleration of the vehicle, and
   when taking the acceleration of the vehicle as the traveling state, the predetermined traveling state is set as the acceleration of the vehicle included in an acceleration range including zero.

2. The information providing device according to claim 1, comprising:
   an input device that detects a reaction of a user of the vehicle to the information;
   wherein, the controller estimates a preference of the user on the basis of a reaction of the user to the information detected by the input device in a period in which the said condition is satisfied.

3. The information providing device according to claim 2, wherein the information according to the predetermined emotion includes a question for estimating the preference of the user.

4. The information providing device according to claim 2, wherein the controller estimates an emotion of the user of the vehicle,
   wherein the controller is configured to determine the reliability of a reaction of the user detected by the input device according to the emotion of the user estimated.

5. The information providing device according to claim 3, wherein the controller estimates an emotion of the user of the vehicle,
   wherein the controller is configured to determine the reliability of a reaction of the user to the information detected by the input device according to the emotion of the user estimated.

6. The information providing device according to claim 1, wherein the traveling state of the vehicle includes a traveling speed of the vehicle, and
   when taking the traveling speed of the vehicle as the traveling state, the predetermined traveling state is set as the traveling speed of the vehicle is included in a speed range that does not include zero.

7. The information providing device according to claim 2, wherein the traveling state of the vehicle includes a traveling speed of the vehicle, and
   when taking the traveling speed of the vehicle as the traveling state, the predetermined traveling state is set as the traveling speed of the vehicle is included in a speed range that does not include zero.

8. The information providing device according to claim 3, wherein the traveling state of the vehicle includes a traveling speed of the vehicle, and
   when taking the traveling speed of the vehicle as the traveling state, the predetermined traveling state is set as the traveling speed of the vehicle is included in a speed range that does not include zero.

9. The information providing device according to claim 4, wherein the traveling state of the vehicle includes a traveling speed of the vehicle, and
   when taking the traveling speed of the vehicle as the traveling state, the predetermined traveling state is set as the traveling speed of the vehicle is included in a speed range that does not include zero.

10. The information providing device according to claim 5,
    wherein the traveling state of the vehicle includes a traveling speed of the vehicle, and
    when taking the traveling speed of the vehicle as the traveling state, the predetermined traveling state is set as the traveling speed of the vehicle is included in a speed range that does not include zero.

11. An information providing method, which is a method that is executed by a computer including an output unit that outputs information and a traveling state detection unit that detects a traveling state of a vehicle, the method comprising:
    a first step of determining a virtual emotion of the vehicle; and
    a second step of determining one or both of content and an output mode of the information that the output unit is caused to output according to the virtual emotion of the vehicle,
    wherein the first step comprises:
    determining whether the traveling state of the vehicle is a predetermined traveling state;
    selecting a type from a first emotion type and a second emotion type based on whether a period in which the detected traveling state of the vehicle is the predetermined traveling state has continued for a predetermined period or longer;
    estimating an emotion of a user of the vehicle;
    selecting an emotion from the selected type as the virtual emotion of the vehicle based on the emotion of the user of the vehicle,
    wherein the second emotion type is selected when the period in which the traveling state of the vehicle detected by the sensor is the predetermined traveling state has not continued for a predetermined period or longer,
    wherein the traveling state of the vehicle includes an acceleration of the vehicle, and
    when taking the acceleration of the vehicle as the traveling state, the predetermined traveling state is set as the acceleration of the vehicle included in an acceleration range including zero.

12. The information providing device according to claim 1, wherein the first emotion type is selected when the period in which the traveling state of the vehicle detected by the sensor is the predetermined traveling state has continued for a predetermined period or longer.

13. An information providing method according to claim 11, wherein the first emotion type is selected when the period in which the traveling state of the vehicle detected by the sensor is the predetermined traveling state has continued for a predetermined period or longer.

* * * * *